UNITED STATES PATENT OFFICE.

REIDAR NIELSEN AND VICTOR MORITZ GOLDSCHMIDT, OF CHRISTIANIA, NORWAY, ASSIGNORS TO TITAN CO. A/S., OF CHRISTIANIA, NORWAY.

PROCESS OF PRODUCING PIGMENTS.

1,343,468.  Specification of Letters Patent.  Patented June 15, 1920.

No Drawing.  Application filed May 16, 1917. Serial No. 169,108.

*To all whom it may concern:*

Be it known that we, REIDAR NIELSEN and VICTOR MORITZ GOLDSCHMIDT, both subjects of the King of Norway, residing at Christiania, Norway, have invented certain new and useful Improvements in Processes of Producing Pigments; and we do hereby declare the following to be a full, clear, and exact description of the invention, such as will enable others skilled in the art to which it appertains to make and use the same.

This invention relates to a process whereby the filtrate remaining after the precipitation of titanium hydrates from a solution of titanium and iron sulfates may be utilized for the production of pigments rich in iron oxid.

In the production of titanium pigments from titaniferous ores it is customary to subject the ores to the action of a decomposition agent, most commonly sulfuric acid, to form a solution of the resultant salts, to effect precipitation of titanium hydrates from this solution and to utilize the precipitate in the manufacture of the pigments. When the precipitation has taken place and the precipitated titanium compounds removed there remains a solution containing a considerable quantity of free sulfuric acid, iron sulfate, and a small quantity of titanium sulfate. It is with such a solution that this invention has in part to do. The invention contemplates both the process of utilizing this solution as a raw material from which titanium-iron-oxid pigments are to be obtained and the pigments themselves preferably though not necessarily made in accordance with such process. The pigments vary from a red to a brown color depending upon their composition and are superior to pure iron oxid pigments both in resistance to chemical and physical influence and in hiding power.

The process broadly contemplates the evaporation of such a solution to drive off all of the water and free sulfuric acid, heating the residue to decompose the sulfates, adding a corrective material, such as calcium or barium carbonate, which will combine with the $SO_4$ radical remaining and render its presence innocuous in the final product, and calcining the mixture thus formed. In carrying out the process the redness of the product may if desired be diminished by removing part of the combined iron before the corrective material is added. The amount of corrective material will obviously be sufficient to combine with all of the $SO_4$ radical present and may be in excess thereof if desired. Where a calcium compound is employed in excess, calcium titanate and calcium ferrites such as $CaO.Fe_2O_3$ and $2CaO.Fe_2O_3$ may be formed. The calcium compound also offers a means of determining the color of the product by varying the amount added. Furthermore the color may be modified by employing a reducing agent. By temperature regulation or by reduction the product may be given a violet color which is probably due to the formation of ferrosoferric oxid. The following specific example of carrying out the process is for illustrative purposes only and is not intended to constitute a limitation of the invention.

A solution of titanium and iron sulfates obtained from the decomposition of ilmenite with sulfuric acid and remaining after the precipitation of titanium hydrates therefrom is evaporated to dryness and the free sulfuric acid distilled off. The resulting residue containing sulfates of iron and smaller amounts of the titanium sulfate is then calcined and the sulfates for the most part decomposed and the resultant $SO_3$ driven off.

The mass remaining consists substantially of the oxids of iron, oxids of titanium and a comparatively small amount of the basic sulfates of iron and titanium. The ratio of iron oxid to titanium oxid is at least two to one. Calcium oxid or calcium carbonate, preferably the latter, is added to the mass which is then subjected to a red heat whereby the content of $SO_3$ in the mass is combined with the calcium to form $CaSO_4$ and $CO_2$ is given off. If an excess of the calcium is added, calcium ferrites and calcium titanate will also be formed at this step. The content of $TiO_2$ and $CaTiO_3$, if the calcium compounds are added in excess, impart a lighter shade of color to the pigment and greatly increase its hiding power.

The foregoing detailed description has been given for clearness of understanding and no undue limitation should be deduced therefrom, but the appended claims should be construed as broadly as permissible in view of the prior art.

What we claim as new and desire to secure by Letters Patent of the United States is:

1. The process of producing a material suitable for use as or in the manufacture of a pigment and comprising iron oxid and smaller amounts of titanium oxid and calcium sulfate, which comprises evaporating a solution containing iron and titanium sulfates to dryness, heating the residue to drive off $SO_3$, adding to the decomposition mass a compound of calcium, and heating the resultant mixture whereby the $SO_4$ radical present is combined to form calcium sulfate.

2. The process of producing a material suitable for use as or in the manufacture of a pigment and comprising iron oxid and smaller amounts of titanium oxid and calcium sulfate, which comprises evaporating a solution containing iron and titanium sulfates to dryness, heating the residue to drive off $SO_3$, adding to the decomposition mass calcium carbonate, and heating the resultant mixture whereby the $SO_4$ radical present is combined to form calcium sulfate.

3. The process of producing a material suitable for use as or in the manufacture of a pigment and comprising iron oxid and smaller amounts of titanium oxid and calcium sulfate, which comprises evaporating to dryness a solution containing iron and titanium sulfates from which titanium hydrates have been precipitated, heating the residue to drive off $SO_3$, adding to the decomposition mass a compound of calcium and heating the resultant mixture whereby the $SO_4$ radical present is combined to form calcium sulfate.

4. The process of producing a material suitable for use as or in the manufacture of a pigment and comprising iron oxid and smaller amounts of titanium oxid, calcium sulfate and calcium titanate, which comprises evaporating to dryness a solution containing iron and titanium sulfates from which titanium hydrates have been precipitated, heating the residue to drive off $SO_3$, adding to the decomposition mass a compound of calcium and heating the resultant mixture whereby the $SO_4$ radical present is combined to form calcium sulfate and whereby calcium titanate is formed.

5. The process of producing a material suitable for use as or in the manufacture of a pigment and comprising iron oxid and smaller amounts of titanium oxid, calcium sulfate and calcium titanate, which comprises evaporating to dryness a solution containing iron and titanium sulfates from which titanium hydrates have been precipitated, heating the residue to drive off $SO_3$, adding to the decomposition mass calcium carbonate and heating the resultant mixture whereby the $SO_4$ radical present is combined to form calcium sulfate and whereby calcium titanate is formed.

6. The process of producing a material suitable for use as or in the manufacture of a pigment and comprising iron oxid and smaller amounts of titanium oxid, calcium sulfate, calcium titanate and calcium ferrites, which comprises evaporating to dryness a solution containing iron and titanium sulfates from which titanium hydrates have been precipitated, heating the residue to drive off $SO_3$, adding to the decomposition mass calcium carbonate and heating the resultant mixture whereby the $SO_4$ radical present is combined to form calcium sulfate and whereby calcium titanate and calcium ferrites are formed.

7. The process of producing a product which could be used as a pigment comprising the step of heating iron oxid materials containing combined titanium and a quantity of $SO_3$ in the presence of a calcium compound.

8. The process of producing a product which could be used as a pigment comprising the step of heating iron oxid materials containing combined titanium and a quantity of $SO_3$ obtained by the working up of ilminite and other materials containing combined titanium and combined iron, said heating being carried out in the presence of a calcium compound.

9. The process of producing a product which could be used as a pigment comprising the step of heating iron oxid materials containing combined titanium and a quantity of $SO_3$ obtained by the working up of ilminite and other materials containing combined titanium and combined iron, said heating being carried out in the presence of a calcium compound, and under such conditions that calcium titanate is formed.

10. A pigment substantially consisting of oxid of iron ($Fe_2O_3$) and containing calcium sulfate and titanium dioxid in such a quantity that the proportion $Fe_2O_3$ to $TiO_2$ is at least as 2:1.

11. A pigment substantially consisting of oxid of iron ($Fe_2O_3$) and containing calcium sulfate and titanium dioxid in such a quantity that the proportion of the total $Fe_2O_3$ content and the total $TiO_2$ content is at least as 2:1.

12. A pigment substantially consisting of oxid of iron ($Fe_2O_3$) and containing calcium sulfate and ferroso-ferric oxid.

13. As a new and useful article, a material suitable for use as or in the manufacture of a pigment and comprising iron oxid and smaller amounts of titanium oxid and calcium sulfate, formed by evaporating a solution containing iron and titanium sulfates to dryness, heating the residue to drive off $SO_3$, adding to the decomposition mass a compound of calcium, and heating the resultant mixture whereby the $SO_4$ radical present is combined to form calcium sulfate.

14. As a new and useful article, a material suitable for use as or in the manufacture of a pigment and comprising iron oxid and smaller amounts of titanium oxid, calcium sulfate, and calcium titanate, formed by evaporating to dryness a solution containing iron and titanium sulfates from which titanium hydrates have been precipitated, heating the residue to drive off $SO_3$, adding to the decomposition mass calcium carbonate and heating the resultant mixture whereby the $SO_4$ radical present is combined to form calcium sulfates and whereby calcium titanate is formed.

In testimony that we claim the foregoing as our invention, we have signed our names in presence of two subscribing witnesses.

REIDAR NIELSEN.
VICTOR MORITZ GOLDSCHMIDT.

Witnesses:
C. NORMAN,
KARL L. LEE.